Figure 1:
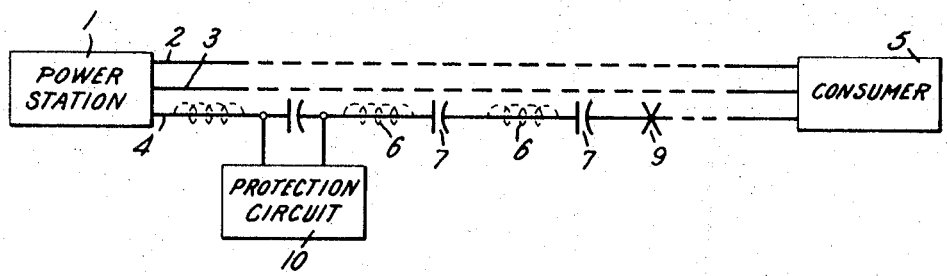

United States Patent

[11] 3,614,532

| [72] | Inventors | Sidney R. Smith, Jr.<br>Lenox, Mass.;<br>Willem F. Westendorp, Schenectady, N.Y. |
|---|---|---|
| [21] | Appl. No. | 42,326 |
| [22] | Filed | June 1, 1970 |
| [45] | Patented | Oct. 19, 1971 |
| [73] | Assignee | General Electric Company |

[54] TRIGGERED VACUUM GAP KEEP-ALIVE CIRCUIT
4 Claims, 2 Drawing Figs.

[52] U.S. Cl. .................................................. 317/16,
317/12 R
[51] Int. Cl. ...................................................... H02h 7/16
[50] Field of Search ........................................... 317/16, 12
R, 12 A, 12 B, 11 R

[56] References Cited
UNITED STATES PATENTS

| 3,538,381 | 11/1970 | Cuttino et al. ................. | 317/12 A |
| 3,489,873 | 1/1970 | Kurtz et al. ..................... | 317/11 R |

Primary Examiner—James D. Trammell
Attorneys—Paul A. Frank, John F. Ahern, Richard R. Brainard, Julius J. Zaskalicky, Frank L. Neuhauser, Oscar B. Waddell, Joseph B. Forman and Paul F. Wille ABSTRACT: This disclosure relates to a "keep-alive" circuit for a triggered vacuum gap wherein the duration of the usual trigger pulse is insufficiently long to maintain the vacuum gap in an active state for more than one-half cycle at the powerline frequency. A circuit utilizing current transformers is described wherein a current transformer provides the trigger pulse necessary to maintain the vacuum gap in an active state for as long as necessary to protect electrical equipment shunted by the vacuum gap.

PATENTED OCT 19 1971　　3,614,532

Inventors:
Sidney R. Smith, Jr.
Willem F. Westendorp,
by Paul A. Frank
Their Attorney.

TRIGGERED VACUUM GAP KEEP-ALIVE CIRCUIT

This invention relates to triggered vacuum gaps; specifically, to "keep-alive" circuits for maintaining the vacuum gap in an active state, i.e, a state in which an electric discharge across the gap is readily obtainable.

In power distribution systems, the great length of the powerlines suspended above the earth acts as an inductance in series with the powerlines. It is the practice to compensate for this series inductance by coupling a series capacitance into the powerline. This series capacitance takes the form of large banks of capacitors spaced more or less regularly along the powerline; for example, every 100 miles. The powerlines also have an associated capacitance between the powerline and ground. This is compensated for by a shunt inductor usually located with the capacitor banks.

A problem faced by the capacitor banks, and not by the shunt inductor, is that the capacitor banks are in a series circuit with the powerline and therefore must be able to withstand the current carried by the powerline. A problem develops however when an overload or short circuit of the powerline occurs. When this happens, the current through the capacitor bank may go to five or more times the rating of the bank. If these conditions are not enough to destroy the capacitor bank, they weaken the dielectric sufficiently that another fault on the line would destroy the capacitor.

Two basic approaches may be taken to alleviate this problem. One is to utilize capacitors of sufficiently high current capacity to withstand faults on the powerline. The cost of this approach tends to be rather high relative to the benefits received.

The second approach is to utilize capacitor banks of sufficient current rating to withstand brief overloads until ancillary equipment can either shunt the capacitor bank and carry the current or take the capacitor bank out of the circuit. This second approach generally envisions a spark gap connected in parallel (shunt) with the capacitor bank so that, when an overload current induces a higher than normal voltage across the bank, an arc is initiated between the electrodes of the spark gap. This arc then safely carries the current which would otherwise pass through the capacitor bank.

The use of spark gaps in conjunction with capacitor banks is not new and is not a panacea. There are difficulties in the use of spark gaps and it is to these difficulties that the present invention is addressed. When a fault induces a heavy overload current, the voltage across the capacitor rises until the breakdown voltage of the gap is reached. An arc is struck across the gap and the gap carries both the overload current and the discharge current of the capacitor bank. This, however, lasts for only one-half of a cycle. At the end of one-half cycle, the arc ceases and the capacitor bank must then be charged sufficiently to retrigger an arc. Thus, the capacitor bank is again exposed to the full overload current for the next half cycle. This procedure continues until a mechanical switch has had a chance to be activated in order to bypass the capacitor bank and spark gap.

In view of the foregoing, it is therefore an object of the present invention to provide an improved protective circuit wherein overload currents bypass the protected device.

It is a further object of the present invention to provide an improved triggering circuit for triggered vacuum gaps.

It is another object of the present invention to provide an improved triggering circuit utilizing current transformers to sense an overload current and produce a trigger signal in response thereto.

The foregoing objects and advantages are achieved by the present invention wherein there is provided a triggered vacuum gap shunting the capacitor bank to be protected, a pair of current transformers connected one to each side of said capacitor bank and having their primaries in series therewith. Connecting the secondaries of the current transformers is a second, preset spark gap which is also connected to the trigger electrodes of the triggered vacuum gap. Upon an overload current, the secondary voltage of the current transformers increases thereby triggering the preset spark gap. Current through the preset spark gap also flows through the trigger electrodes, triggering the triggered vacuum gap into an active state so that the triggered vacuum gap carries the current which would otherwise flow through the capacitor bank.

The various features of the invention may best be understood by considering the following detailed description in conjunction with the attached drawings, in which:

FIG. 1 illustrates the general use to which the present invention may be put.

Figure 2:
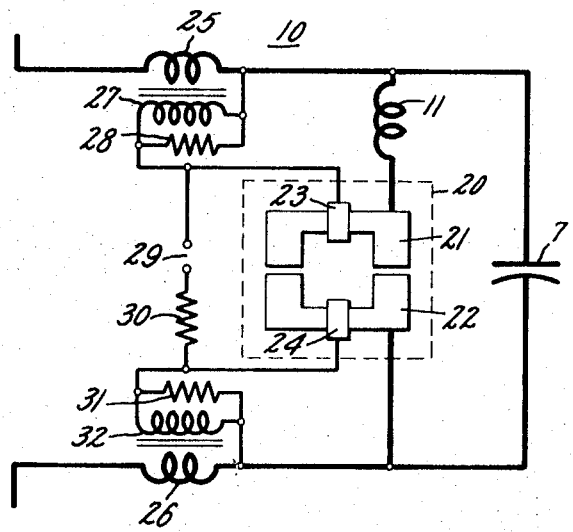

FIG. 2 illustrates a preferred embodiment of the present invention. Referring to FIG. 1 there is shown a portion of a typical power distribution system. Power generated in power station 1 is conveyed to the consumer at location 5 by way of powerlines 2, 3, and 4. Illustrated along line 4 is the inductance 6 due to the length of the powerline above the surface of the earth. In order to compensate for inductance 6 there is inserted along the length of the transmission line a series of capacitors 7 spaced at more or less regular intervals. These capacitors are in series with the powerline and in effect form a series-resonant circuit with the inductance of the powerline. The circuit is made to be approximately resonant at the powerline frequency.

If a fault occurs, such as a short circuit at location 9, an overload current is drawn which must pass through series capacitors 7. In the event of a fault, protection circuits associated with each of the series capacitors, such as protection circuit 10, interrupt the flow of current through the series capacitor by short circuiting it. Protection circuits such as protection circuit 10 may also include switching apparatus for switching the current to an alternate transmission line in an attempt to bypass the fault. The present invention is directed to protection circuits that serve to carry the current for the series capacitor thereby preventing damage of the series capacitor by a high overload current.

A specific embodiment of the present invention is shown in FIG. 2 wherein there is illustrated in detail the form of protection circuit 10 in accordance with the present invention. The protection circuit comprises first and second current transformers having their primaries 25 and 26, respectively, connected in series with series capacitance 7. Shunting series capacitance 7 is a triggered vacuum gap comprising a vacuum envelope 20, first and second electrodes 21 and 22, and trigger electrodes 23 and 24. Coupled to the trigger electrodes is a pilot gap comprising electrodes 29 and current-limiting resistor 30. Connected to the trigger electrodes are the secondaries 27 and 32 of the first and second current transformers, respectively. Connected across the secondaries of the first and second current transformers are loading resistances 28 and 31, respectively. One end of the secondaries of each of the current transformers is connected to the main electrode of the triggered vacuum gap. Inductance 11 is in series with series capacitor 7 to prevent the triggered vacuum gap from appearing as a short circuit across the capacitor terminals.

The overall operation of the protection circuit illustrated in FIG. 2 is as follows; During normal operating conditions the current through series capacitor 7 and primaries 25 and 26 is not sufficient to induce a high voltage in the secondaries of the current transformers. Consequently, the pilot gap 29 and the triggered vacuum gap comprising elements 20 through 24 are not activated. However, when there is a current overload, the current through the primaries of the current transformers increases thereby inducing a higher secondary voltage. This higher secondary voltage causes an electrical discharge across pilot gap 29. When this happens the current then flows through main electrode 21, trigger electrode 23, pilot or preset spark gap 29, current-limiting resistor 30, trigger electrode 24, and main electrode 22 to the powerline. This current path then briefly carries the overload current and the discharge current of series capacitor 7. The current through trigger electrodes 23 and 24 initiates the discharge through the triggered vacuum gap. There is then an arc produced between main electrodes 21 and 22 of the triggered vacuum gap. This discharge then carries the overload current and effectively bypasses the series capacitor 7. At the end of the half cycle, the current becomes zero and the discharge terminates. The second half cycle will again induce an electric discharge across main electrodes 21 and 22 in the manner described above. There is no need for the series capacitor 7 to charge up to an overvoltage before the triggered vacuum gap becomes activated. Thus, the current transformers and other triggering elements maintain the triggered vacuum gap in an active state for as long as necessary to protect the series capacitor.

While one preferred embodiment of the present invention has been shown and described, it will be obvious to those skilled in the art that many modifications are available within the scope of the present invention. For example, while the preferred embodiment has contained a somewhat symmetrical triggering arrangement, it will be apparent to those of ordinary skill in the art that only one current transformer and trigger electrode need be used. Further, if the triggered vacuum gap contains a central electrode, a second pilot gap and current-limiting resistor may be added with the central electrode of the triggered vacuum gap coupled to the junction of the series connected pilot gaps.

What we claim as new and desire to secure by Letters Patent of the United States is:

1. An overcurrent protection circuit comprising: current transformer means having a primary and secondary winding, said primary winding connected in series with a device to be protected, triggered vacuum gap means having a pair of main electrodes and a trigger means for activating said triggered vacuum gap by interacting with one of said main electrodes, pilot gap means having a first and second electrode, said pilot gap means having its first electrode connected to said secondary winding and said trigger means and its second electrode coupled to the other of said main electrodes, whereby an overcurrent through the device to be protected induces a trigger voltage in the secondary of said current transformer means causing an electric discharge across said pilot gap which, in turn, causes the trigger means to activate said triggered vacuum gap means thereby shunting the current around the device to be protected.

2. An overcurrent protective circuit as set forth in claim 1 wherein:

said current transformer means comprises first and second current transformers, each having a primary and a secondary winding and each having its primary winding connected in series with the device to be protected, said triggered vacuum gap means comprises a pair of main electrodes, a pair of trigger electrodes, said trigger electrodes located one each in close proximity to each of the main electrodes so as to induce, when activated, an electric discharge between said main electrodes, and said pilot gap is connected to said trigger electrodes.

3. An overcurrent protection circuit as set forth in claim 2 further comprising:

a current-limiting resistance in series with said pilot gap.

4. An overcurrent protection circuit as set forth in claim 3 further comprising:

load means connected across the secondary of each current transformer.